Aug. 2, 1949.  E. E. NOVOTNY  2,478,005
INJECTION MOLDING APPARATUS
Filed July 2, 1943  6 Sheets-Sheet 4

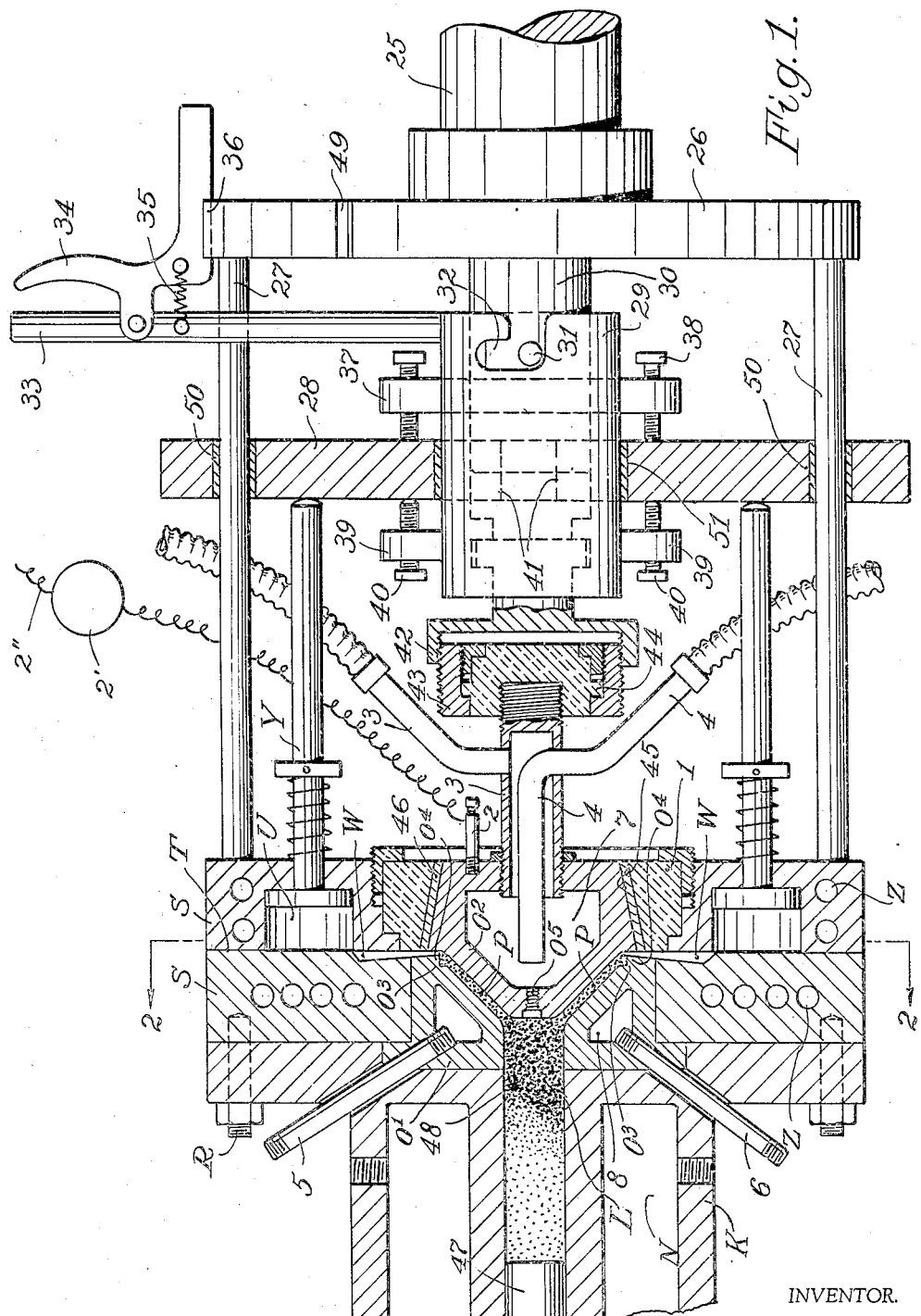

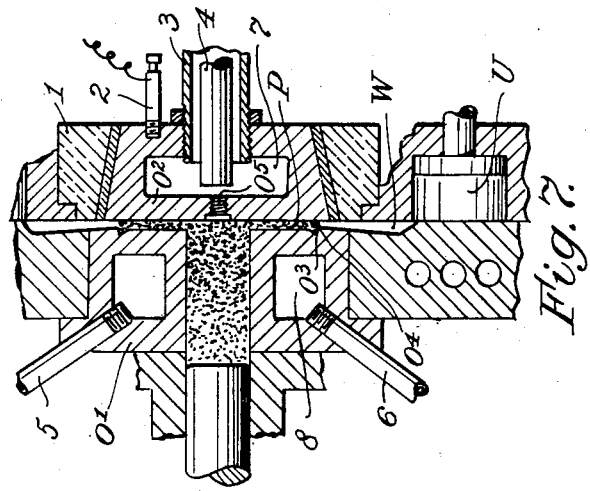
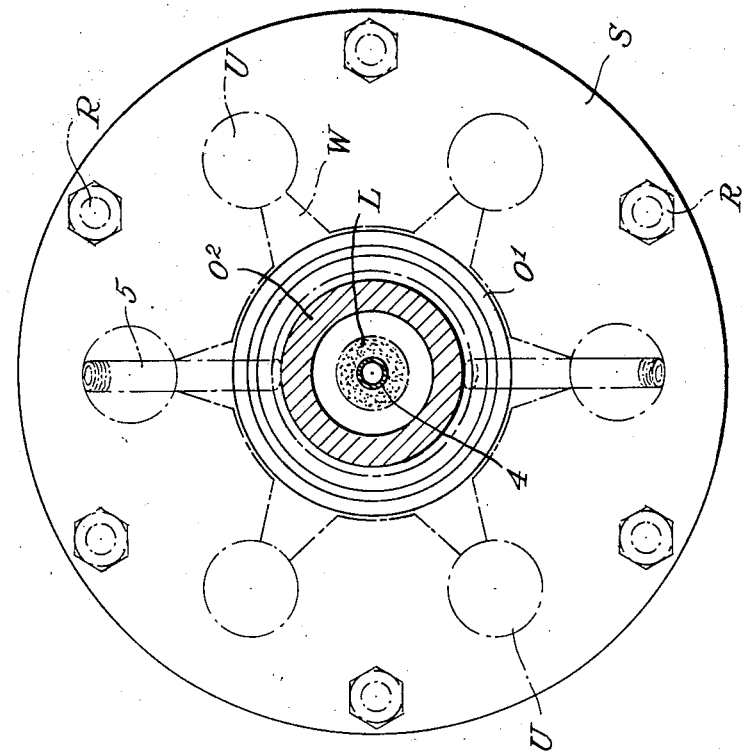

INVENTOR.
Emil E. Novotny
BY
ATTORNEYS

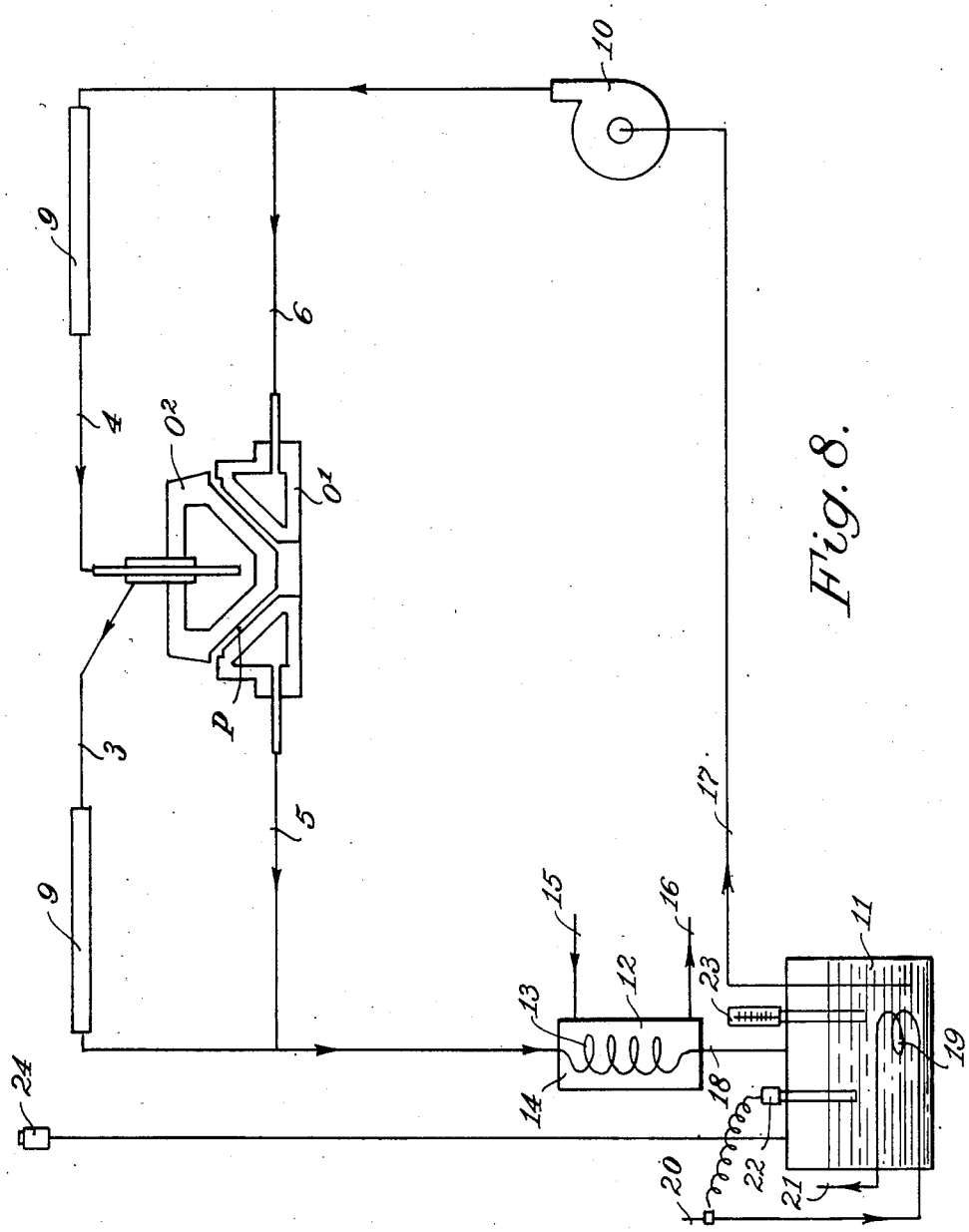

Patented Aug. 2, 1949

2,478,005

UNITED STATES PATENT OFFICE 2,478,005

INJECTION MOLDING APPARATUS

Emil E. Novotny, Prospectville, Pa., assignor, by mesne assignments, to The Borden Company, New York, N. Y., a corporation of New Jersey Application July 2, 1943, Serial No. 493,192

7 Claims. (Cl. 18—30)

This invention is directed to an apparatus for molding of thermoplastic and thermosetting materials.

The prime object of my present invention centers about the provision of an apparatus for molding plastic materials in which the plastic materials are heated and molded under conditions of low pressure utilizing a low friction nozzleless and clogless apparatus.

In accordance with the principles of my present invention, plastic materials are heated and molded under conditions of minimum pressure, the material being heated in an enclosed heating chamber of relatively large area and volume, the pressure being generated in and derived from a material feed and pressure channel in open communication with the heating chamber. The heating chamber leads to and communicates with the mold cavity of the apparatus. A low friction nozzleless method of molding is provided in which the plastic mass, heated in the heating chamber in a relatively homogeneous state, is carried to the mold cavity under the low pressure produced in the feed and pressure channel (where the material is preferably unheated), the product being formed to the required shape in the mold cavity. For thermosetting materials, the heating in the heating chamber may be sufficiently high in temperature for exothermic reaction to take place, and for the material to cure rapidly even though the mold cavity be unheated, whereby if desired the molded piece may be rapidly ejected from or through the mold cavity to permit final reaction to take place outside the mold. The heating chamber is also adjustable to vary the thickness of cross-section of material being heated, the said heating chamber being manually openable at any time or automatically openable at a predetermined point in the molding cycle.

My U. S. Patent No. 1,997,074, dated April 9, 1935, teaches the use of high pressures in injection molding, terming these super-pressures. These super-pressures were necessary to utilize materials of the character such as would be used in ordinary positive pressure molds, but it was found that because of the small nozzle openings the material could not be carried through these nozzles due to the enormous amount of back-pressures encountered, hence these high super-pressures. Such pressures were not required within the mold cavity itself. My present improved method eliminates the use of nozzle orifices and provides large heating areas and an adjustable heating chamber with material flowing through in substantial thickness, permitting heating and molding operations to be carried out at relatively low pressures.

My U. S. Patent No. 1,319,107, issued October 21, 1919, describes a transfer or injection molding method for the production of printing plates. The pressure chamber (24 of Figure 4) calls for preheated materials to be placed therein; the mold cavity must be heated, and a multiplicity of relatively small orifices are provided as shown in Figures 3 and 9. The method of my present invention obviates the preheating of the material, eliminates the orifices or nozzle effect, permits the molding of material which has been highly plasticized at high temperature, and which is delivered to the mold in its highest form of plasticity at low pressures, and into molds which may be relatively fragile.

In my copending application Serial No. 317,811, filed February 8, 1940, now Patent No. 2,356,081, granted August 15, 1944, I disclose an injection method and apparatus for molding thermosetting materials in which the material is first fluidized and superheated and then fed to the mold for forming or shaping, the molded piece containing sufficient stored up heat acquired in the superheating step to enable curing of the formed piece to take place after ejection from the mold. The method of the present invention relates in part to certain improvements of the method disclosed in this copending application.

Other objects of my present invention are as follows:

1. The use of a controlled heating means for a plastic mass and as distinguished from the usual high pressure, high velocity, small cross-sectional heat transfer superheating nozzle, the heating being carried out in large volume through the use of heating surfaces of large area, variable as to cross-sectional thickness of material to be heated, to provide, at low pressures, a heated mass of required volume.

2. Utilization of electrostatic high frequency heating in an injection method of molding. The apparatus of my present invention when employed with high frequency heating provides a relatively large electrode surface and an easily adjudged variable distance between the electrodes, thus permitting the heating of a relatively large and thick mass of material to optimum molding temperatures while maintaining a closed heating chamber during the flow of the material from the heating chamber to the mold cavity.

3. The adjustable distance between the electrodes is also provided for the purpose of varying the thickness of plastic material being molded due to the molding of materials of high and low insulation resistance when heated to prevent voltage punctures or arcing-through short circuits. This adjustment also allows for maximum voltage with correspondingly lower frequency, insuring the greatest penetration of heating and uniform cross-sectional heating, as contra-distinguished from a fixed thickness of materials having variable insulation resistance, wherein voltage adjustment must necessarily be made and compensated for by higher frequencies, which in turn tend to provide predominantly surface heating phenomena.

4. In an injection molding apparatus which in its operation permits of a balance between velocity, mass of material in the heating chamber, the timing of the active interval of the high frequency electrostatic field of heating, against requirements of temperature build-up or temperature required for rapid exothermic reaction to ensue and the mold cavity volume requirements. Under these conditions of balance, moldings of uniform strength and faithful replicas of the mold cavity are readily and automatically reproducible. Furthermore, materials may be heated to a temperature close to the temperature of decomposition, which is often called for in order to attain highest exothermic reactivity rates without danger of overheating to the decomposition point. Furthermore, the maintenance of the material in a uniformly compressed condition avoids danger of arcing-through. The maintenance of the electrodes at a constant temperature, with a substantially lower temperature differential between them and the material being heated prevents conductive transfer of heat from the material to the electrodes and limits these to a safe maximum temperature.

5. The provision of a controlled fluid heating system connected to a circulating and insulating fluid through the electrodes, the system being controlled as to temperature, thus heating by conduction and assisting the heating by means of the electrostatic field.

To the accomplishment of these objects and such other objects as may hereinafter appear, my invention relates to the molding method and apparatus hereinafter more particularly described in the specification and sought to be defined in the claims. The specification is accompanied by drawings in which:

Figure 1 is a partly sectioned longitudinal cross-sectional view of the essential parts of my molding apparatus showing the position of the parts after a molding cycle and at the start of a new cycle;

Figure 2 is a view thereof taken in cross-section in the plane of the line 2—2 of Figure 1;

Figure 6 is a view of a heated extension of the positive electrode;

Figure 7 is a sectioned longitudinal view of a modification, showing a part of the apparatus, the electrodes being flat and circular instead of being in the form of truncated cones; and Figure 8 is a diagrammatic view depicting the controlled fluid heating system.

Figure 3:
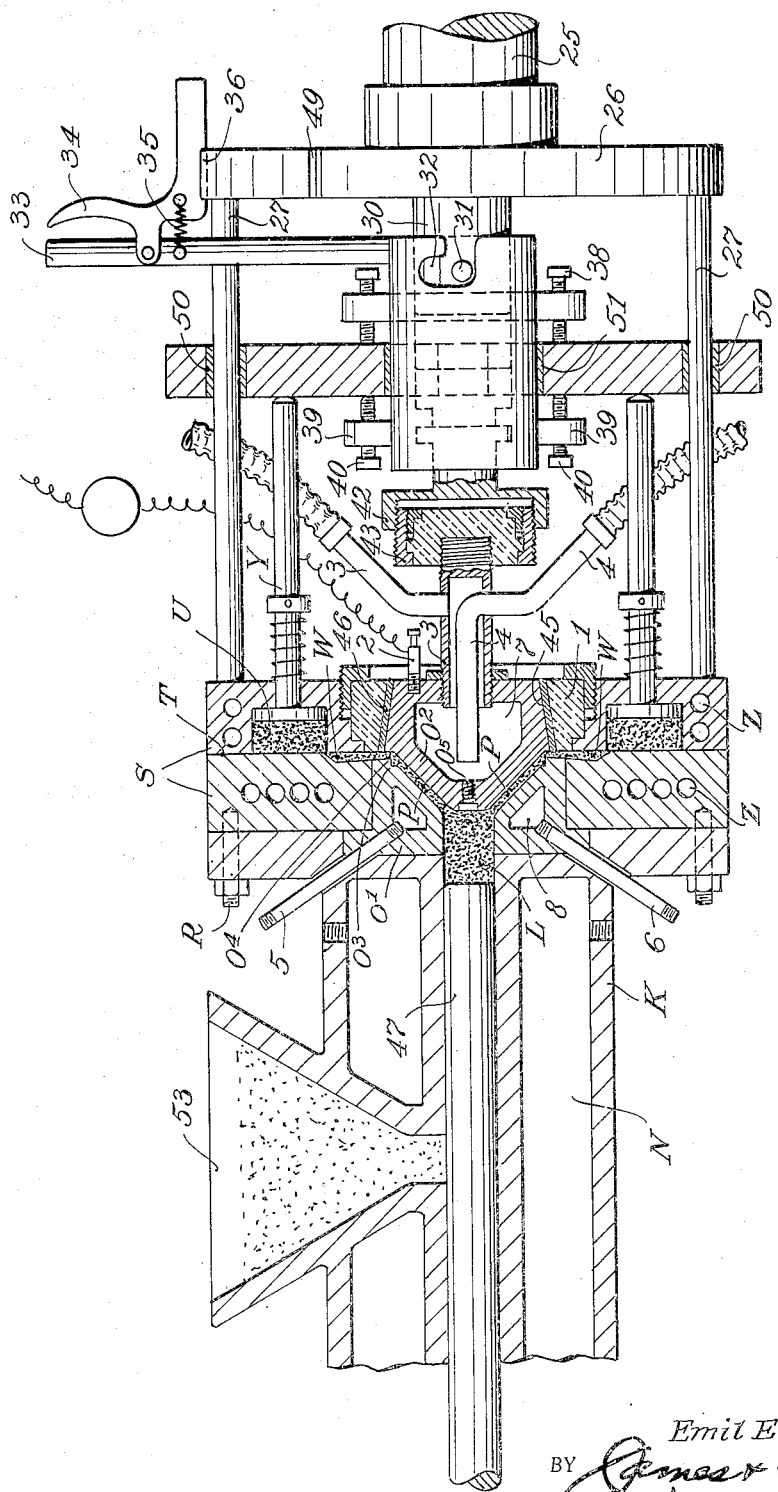
Figure 3 is a partly sectioned longitudinal cross-sectional view of the apparatus showing the position of the parts when the mold cavities have been filled.

The method of my present invention may be described by reference to the corelated parts of the apparatus depicted in the drawings. The plastic material flows from a pressure channel L through a heating chamber P of large area and volume defined by the units O' and $O^2$ to one or more mold cavities U by way of the connecting passages W. The pressure channel L, which is both a material feed and pressure channel, opens directly into the heating chamber P, and the said heating chamber acts to heat the plastic material therein under the low pressure generated or produced in the feed and pressure channel L. The heating chamber P leads to and communicates with the mold cavities U by way of the passages W. The units O' and $O^2$ in the form of the invention here shown comprise electrodes for electrostatically heating the plastic material in the chamber P, the unit O' being a grounded electrode and the unit $O^2$ being an insulated electrode. The units or electrodes O' and $O^2$ are movable one relatively to the other for the purposes referred to, the unit or electrode $O^2$ in the form of the invention depicted in the drawings being the movable unit and the unit or electrode O' being the fixed unit. The mold cavities U are defined by the two mold members S having the parting line T, one of which members is fixed and the other of which is movable; and associated with the movable mold member there are provided the ejectors Y, one for each mold cavity.

The material feed and pressure channel L is formed centrally in a cylinder K cored as at N, and the said cylinder K may be integrally provided with a material containing hopper 53 which opens into the pressure channel L. A ram or plunger 47 operates in the pressure channel L to force feed the material gravitating thereinto from the hopper 53 (see Figs. 4 and 5) into the advance end 48 of the pressure channel L thereby placing the material under pressure at this end 48, as depicted in Figs. 1 and 3 of the drawings.

The molding cycle may now be described by reference to this part of the apparatus as shown in the sequential views of the drawings.

Fig. 1 shows these essential parts of the molding apparatus just after a molding cycle, the molded products formed in the mold cavities U and the sprue gates formed in the passage W having been ejected. The mold is closed and the plastic material is being placed under pressure in the advance end 48 of the pressure channel L and thereby in the heating chamber P. To attain the desired pressure, the ram 47 is moving from the position shown in Fig. 4 to the position shown in Fig. 3 of the drawings. The material in the pressure channel L is preferably unheated. The material seen in the heating chamber P remaining from a previous charge is in a partially heated condition, and is retained in the chamber P through suitable back draft arrangements $O^3$ and breaking edges $O^4$ on the heating unit or grounded electrode O'. Where electrostatic heating is used, this partial heating of the material in readiness for the next mold cavity charge is accomplished through proper interval cycling of a timing switch 2' leading to the connector 2 attached to the insulated electrode O², the electrodes O' and O² being thereby connected to an electrostatic high frequency generator or suitable energy source indicated as 2''. During the cycling step depicted in Fig. 1, the volume of material in the heating chamber P is heated to the desired temperature, under the pressure generated in the pressure channel L, between the extensive surfaces provided by the heating units or electrodes O' and O².

Fig. 3 of the drawings illustrates the condition where the molding stroke of the ram or plunger 47 has been completed and the heated material has been caused to flow into the mold cavities. The mold cavities U have been filled and are under pressure exerted by the material in the advance end 48 of the pressure channel L. During the flow of the material into the mold, it is heated in transit in the heating chamber P. The cycling may be such that the material within the mold cavity passages W and the cavities U has been heated to a point of exothermic reaction, such that the molded parts in the mold cavities U as well as the gates within the passages W are ready for ejection from the mold. The ram 47 is also now in a position for a retracting stroke to take place.

Figure 4:
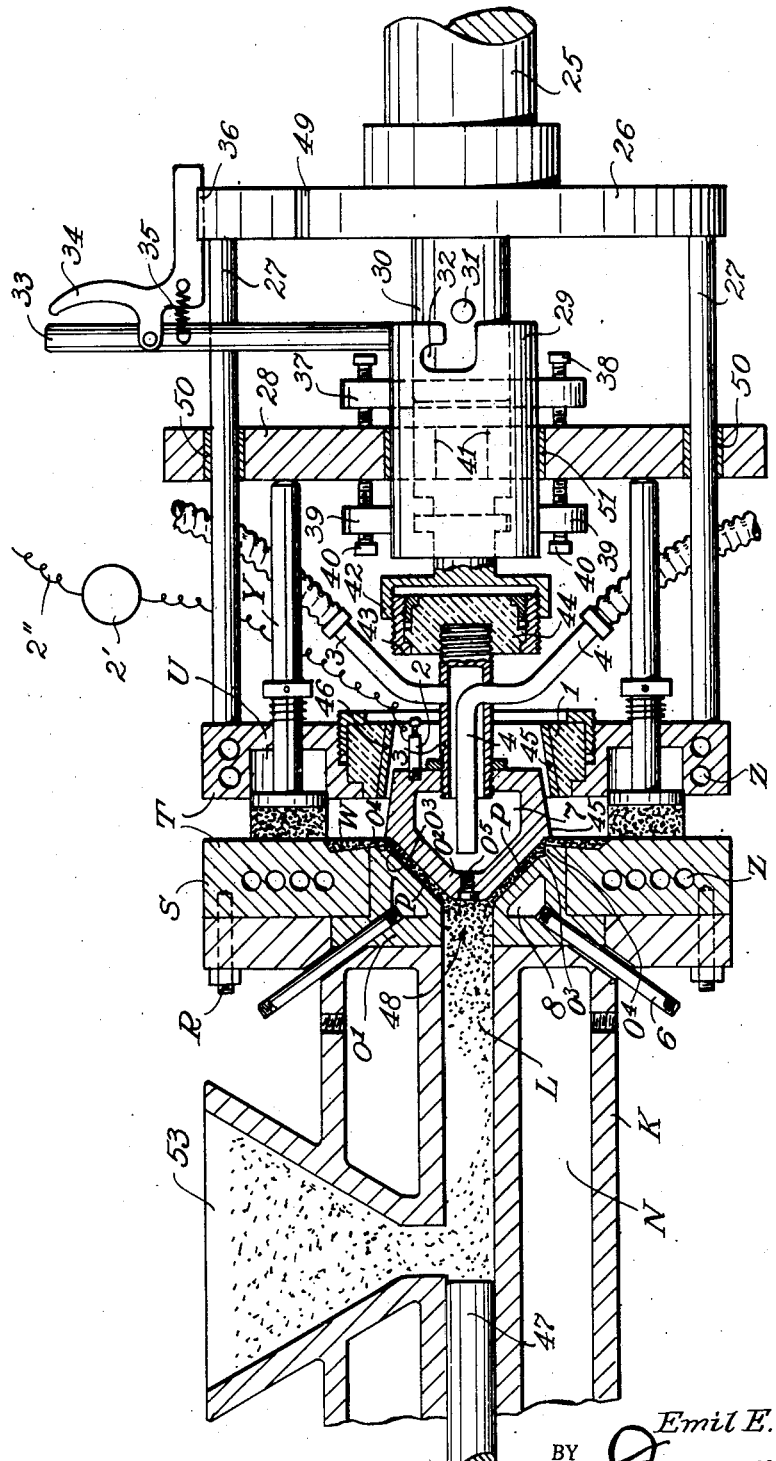
Figure 4 is a partly sectioned longitudinal cross-sectional view of the apparatus showing the position of the parts when the molded parts are being ejected, after completion of the molding cycle but with the electrodes remaining closed.

Fig. 4 of the drawings shows the arrangement of the parts after the molding cycle has been completed. Here the molded products are being ejected from the mold cavities U by means of the ejectors Y. In this illustration the electrode O² is held in closed position with the material in the heating chamber P being heated. While the mold sections S, S are open, the heating cycle is so arranged as to bring the material in the heating chamber P up to a maximum temperature prior to its next charged flow to the mold cavities U. The ram 47 has been retracted to permit the entrance and feeding of fresh material from the hopper 53 into the channel L for the next pressure charge.

Figure 5:
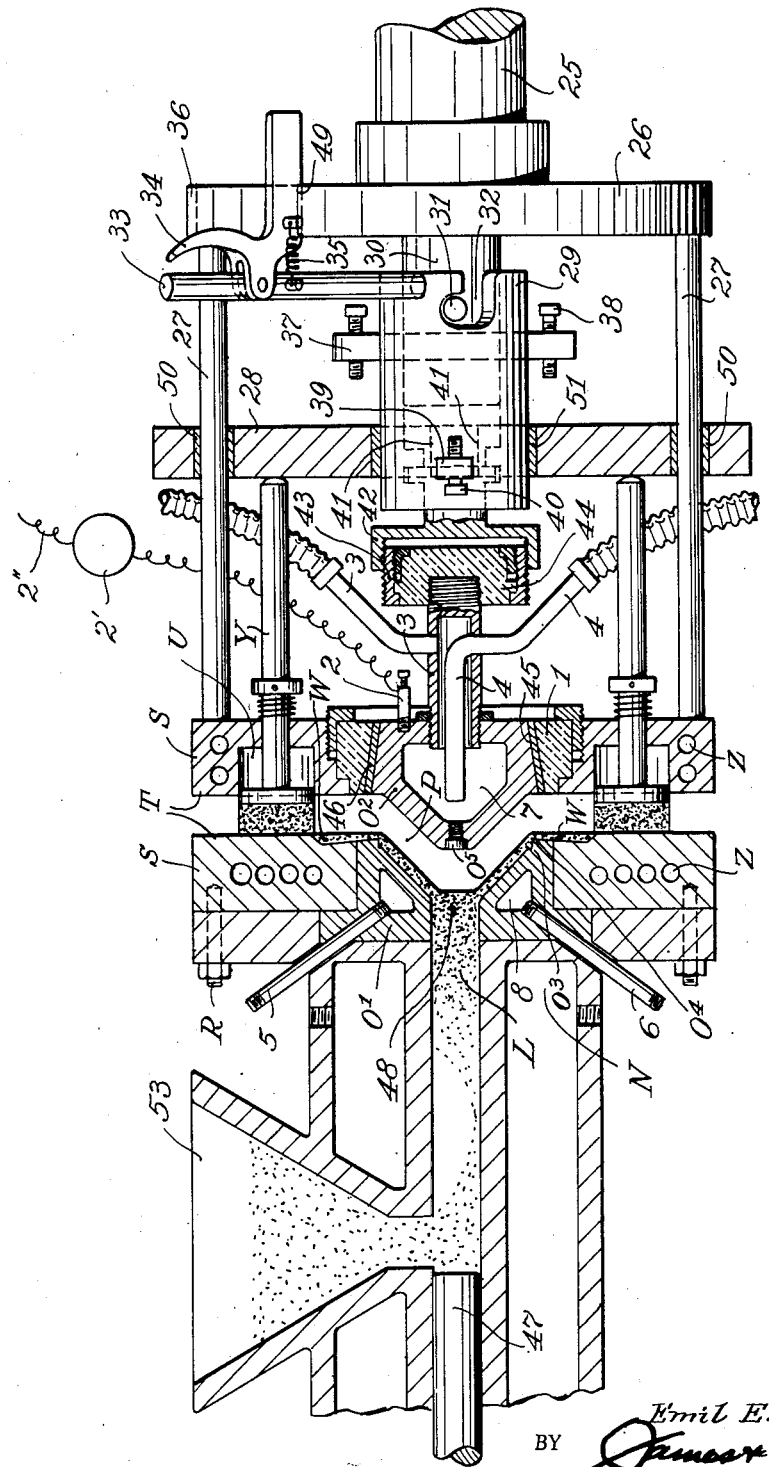
Figure 5 is a partly sectioned longitudinal cross-sectional view of the apparatus showing the position of the parts when the molded parts are being ejected, after completion of the molding cycle but with the electrodes optionally opened.

Fig. 5 of the drawings shows a variation of Fig. 4. Here the heating chamber P has been opened together with the opening of the mold sections S, S. The chamber P has been opened here either for the purpose of adjustment of the unit or electrode O², or inspection of the parts or cleaning of the heating chamber and pressure channel. Ordinarily opening of the heating chamber is not required. When opened, all of the material within the pressure channel L and the material adhering to the surfaces of the heating units O' and O² may be removed and the channels completely cleaned.

While the advantages of electrostatic high frequency heating are particularly advantageous to my invention, it is to be understood that the electrodes O' and O² may merely be heating surfaces, providing an enclosed heating chamber P for the material feeding under pressure to the mold, and that any suitable means of heating may be utilized. The apparatus will function satisfactorily for many uses without the electrostatic high frequency heating, depending, of course, on the materials to be molded. Advantages accrue from this method and construction due to the large area and volume exposed to heating, the elimination of nozzles and the utilization of substantially lower effective molding pressures, due to reduction of frictional losses.

While this method covers the molding of articles my injection, implying a closed mold cavity, it will be understood that this method may be utilized for molding by ejection where substantially continuous lengths of material having uniform cross-sectional shapes are to be molded. While the molds S, S may be unheated, it will be understood that the process broadly covers the molding of many types of materials and that therefore the heating or cooling of the molds is not precluded.

The apparatus may be utilized in any position. For some work calling for a large number of inserts a vertical arrangement with inserts maintained in the mold through gravity may be advantageous. Similarly, the drawings indicate the usual type of pressure cylinder plunger or ram. However, the exertion of pressure on the unplasticized mass and at relatively low operating pressures makes possible the use of a single or double screw pressure feed device, or a relatively short stroke, eccentric or otherwise operated vibrating pressure means may be used. The construction in its salient parts may be used in the form of the usual hydraulic press assembly, or may even be arranged to be operated in conjunction with a hand mold operated in a hydraulic press.

While it is not necessary to specify a minimum molding pressure, tests indicate that for a phenolfurfural type molding compound, strong, well molded parts can be obtained at pressures as low as 75 p. s. i., and that it is not likely that the maximum pressure need to exceed 3000 p. s. i., whereas injection molding methods and apparatus utilizing the nozzle principle, either in thermoplastic or thermosetting materials, require pressures of from 20,000 to 100,000 p. s. i. Construction of the apparatus is lighter and less expensive and the molds under these low pressures may be of weaker construction, and for some purposes may be made of type metal, brass, etc., cast from wood or plaster models, and arranged to be readily and interchangeably placeable in a standard mold ring. Molds not requiring heating under most conditions provide further simplification in the construction of the mold cavities and a more ready means for interchanging of various mold cavities within a standard mold or mold ring.

With the heating chamber closed, at least during the flow of materials therethrough to the mold, it is possible to mold various pasty and liquid materials by forcing these, under regulated pressure and temperature, to be molded to the desired shape, even though such materials do not possess the usual restricted flow of plastic molding compositions. It is possible to mold products heretofore impossible to mold in automatic injection devices because such products would be too liquid at room temperatures, or else because the products, during their molding flow, would not assume the properties such as are available in restricted flow of "B" stage phenolics.

The apparatus is suited for the production of uncured or partially cured preforms which may be delivered at proper temperature or which may be formed under relatively low heat and allowed to cool, to be subsequently molded in usual molds now available. This is a definite advantage in the handling of various bulky materials which cannot be fed into a preforming press volumetrically to a uniform density and therefore cannot be readily preformed due to bulk or lack of flow characteristics to provide preforms of uniform density, size and shape. This method definitely obviates such difficulties and makes possible the quick and ready molding of preforms; and under certain conditions such performs may be preheated to the point of offering the utmost advantage from the standpoint of a quick method of producing from bulky, comminuted or granular fragmentary materials, products of relatively homogeneous body formed to desired shapes and uniform as to volume density.

By taking advantage of this nozzleless type of preheating, materials, after compressed to uniform density within a relatively closed preheating chamber, may be ejected into various open molds to provide numerous ejected shapes which may be readily drawn from the ejection mold in any suitable lengths. This process of ejection may be carried on as a coating or covering for other formed shapes which may be fed through an injection block, as in the manufacture of insulated wire.

The nozzleless, non-clogging type of molding apparatus of the present invention permits the molding of high impact materials utilizing long fibres or long fragments of woven or felted materials, as cloth, paper, etc. without breaking down the length of fibre and the molding to uniform density without requiring the production of weighed out quantities of materials which are later hand-preformed and subsequently molded. The nozzleless arrangement provides strengths far in excess of those attainable in moldings produced through small orifices in nozzles or jets. There is, furthermore, the possibility of molding at extremely low pressures because of the freedom from nozzles or jets, with the optional advantage of being able to mold many desiccated canvas, paper and fibrous bodies under such conditions of low pressure that the voids and interstices in the fibres may be relatively unimpregnated with the plastic binder, and only a limited amount of binder need be used to provide the bond required and the surface finish called for. These fibrous bodies when coated rather than impregnated allow the fibrous reinforcing materials to exert the greatest technical effect in that direction. Products of high strength and low brittleness, with ease of machining, manipulation and sawing are more readily obtainable. Experience with helmet liners has indicated that such liners, with the resin merely coated on the canvas, molded at pressures of 80 p. s. i., provide products of greater strength than impregnated canvas molded under brute force methods in solid steel dies at pressures running into several thousand p. s. i.

Many brake linings are of the molded type, utilizing relatively long fibered asbestos. In making such linings, asbestos and a resin bond are carefully mixed. Many resins which would have desirable frictional properties cannot be used because of certain physical difficulties in handling. The bulk is usually about ten to one, non-pourable, long fibered, and impossible to level, and the finished molded products must be uniformly dense throughout. This is very difficult through present methods of molding, even though the molding composition is definitely weighed out in small quantities, section for section of brake lining stock material; it is expensive and, furthermore, where materials are of a toxic nature or are odorous, it becomes additionally difficult to handle the process. With the method of molding of the present invention, these materials may readily be screw or plunger fed in a closed system. The products would enter the heating chambers at low pressures, with little or no back-pressure and form a uniformly compressed, homogeneous mass, to be heated between the electrodes or heating surfaces to a uniform temperature, and fed into molds or fed through orifices and drawn therefrom to form products of definite thickness and finish, which in the latter case would call for a cutting-off operation and the drilling of holes to provide for the fastening means to the brake bands. This eliminates many operations required in prior practice.

In the manufacture of printing plates and printing plate matrices it is not necessary to heat either the type form, the electrotype or etching in order to provide a matrix. The material may be fed into a suitable mold under relatively low pressures, at a temperature usually high enough for exothermic reaction to ensue. The type form may even be justified whereby the unevenness in the type in height to paper is represented at the back or bottom of the type, with the printing faces all justified and brought up to give printing or make-ready including printing levels.

Referring now more in detail to the apparatus, the parts already described may be constructed and organized to carry out the referred to functions and other desired operations to be described below.

The electrodes O′ and $O^2$ are cored at 8 and 7, respectively, for the circulation of a fluid heating or cooling medium. A non-electrically conducting heating medium is utilized, which is flowed through the pipes or lines 3 and 4 connected to the insulated electrodes $O^2$ and through the inlet and outlet pipes 6 and 5 connected to the grounded electrode O′. The heating or cooling of the cored pressure cylinder K may optionally be carried out by a separate means, as through the coring N; and likewise the mold S, S may be heated or cooled, as the particular requirements of the particular plastic being molded call for, as at Z. The stationary part or section S of the mold is made conductively integral with the electrode O′ and the cylinder K through the use of the assembly studs and nuts R so that the grounding of such mold section S or cylinder K also grounds the electrode O′. The heating and/or cooling of the cylinder K and the mold S, S may optionally be handled separately and this is true of the electrodes O′ and $O^2$ to the extent that the use of high frequency electrostatic heating may even be eliminated for certain types of molding and the heating may be carried on by any suitable fluid or liquid. In this case also the arrangement may be such that the coring or heating openings 7 and 8 provide heating surfaces having most excellent conductive heat transfer efficiency and may therefore be alternately heated and cooled should the cycle of operations or the type of material call for this in order to permit molding efficiency or to prevent the setting up of the material within the heating passages or within the heating channel P. At 45 is indicated a straight conical joint between electrode $O^2$ and the retractable mold assembly, and at 46 is shown a bronze or other non-abrasive metal sleeve for taking up wear caused by the retraction of the mold when the positive electrode $O^2$ remains stationary.

Variations in plasticity and melting points of plastic materials, the speed of molding cycle, the size of the mold cavities U and other reasons to be reviewed presently often call for variation in the volume of material required to be delivered from the heating channel P and therefore this channel is made adjustable. This may be done by the arrangement of the threaded coupling 43 having an insulation filling 44, the said filling being rotatable (threadedly) on the electrode connected pipe 3, and the said coupling being rotatable (threadedly) on the internally threaded holder 42. By this or other equivalent means it is possible to adjust the cross-sectional thickness of the material within channel P of the heating chamber formed between electrodes O' and $O^2$. The insulation filling 44 as well as the insulation bushing 1 form the means for insulatably supporting the electrode $O^2$. The shape and form of electrodes O' and $O^2$ are also so designed as to permit the utmost in flexibility. In this instance the heating chamber formed by electrode $O^2$ is in the form of a truncated cone with a complementary negative contour forming electrode O'. Many materials vary in insulation resistance and many of these products, even the phenolics, are indeed poor when heated to a high temperature so far as insulation resistance is concerned. Furthermore, it is desirable when utilizing high frequency electrostatic heating to be enabled to utilize a relatively high voltage and low frequency in order to heat throughout the mass, inasmuch as extremely high frequencies may under certain conditions provide only more or less surface heating. For these reasons the adjustment of the heating channel P should be arranged to provide wide variations. Where these electrodes, as indicated here, would have a surface area of approximately 14 sq. in. (without the use of the extenson $O^6$ shown in Fig. 6) and the heating channel P would have a thickness ordinarily of approximately ⅛ inch, it will be found that where electrostatic heating is carried out with phenolic materials the thickness in passage P should be closer to ½ to 1 inch cross-section, particularly where the mold cavities require a large volume of material and the heating cycle is to be efficiently rapid. It is essential for greatest per diem production to so balance the time of heating, the cross section and volume to be heated against a safe optimum heating temperature in order to provide greatest uniformity in molding.

The apparatus provided allows the mold cavity to be opened without opening the heating chamber passage P. This opening of the mold cavity may be carried out by standard or conventional apparatus but is illustrated as being carried out by means of a movable ram 25, actuating plate 26, and connecting rods 27 which latter are attached to the movable section of the mold S. The rods 27 reciprocate in the bronze bushings 50, 50 provided in the stationary supporting plate 28. The line of separation between the movable mold section S and electrode $O^2$ is the conical joint 45. Reciprocation of the ram 25 opens and closes the mold S, S. When the mold is opened, the ejectors Y being anchored against the stationary plates 28 act to eject the molded pieces.

For opening the heating chamber P, I provide mechanism which comprises essentially a sliding coupling 29 connected to the holder 42 and selectively connectable to the ram 25. The sliding coupling 29 is slidable in the bronze bushing 51 provided in the supporting plate 28. The coupling 29 has a bayonet slot 32 in which pin 31 may ride freely back and forth. Pin 31 is attached to shaft 30 which in turn is attached to the actuating plate 26. Lugs 39 attached to coupling 29, together with set screws 40, maintain the predetermined static position of electrode $O^2$. A handle 33 carrying a pivoted trigger 34 rises from and is fixed to the coupling 29. The trigger 34 seats in either the slot 36 or the slot 49 in the periphery of the actuating plate 26. When the handle trigger 34, against the action of spring 35, is released from slot 36 and the handle 33 is drawn down to the point where handle trigger seats in slot 49 (see Fig. 5), pin 31 is caused to enter the bayonet slot 32, engaging the coupling 29 with the shaft 30, causing lugs 39 to enter slots or orifices 41 in the plate 26 (see Fig. 5); and electrode $O^2$ thus becomes free to retract with the mold cavity as depicted in Fig. 5. Attached to coupling 29 is flange 37, provided with set screws 38, which serve to maintain the closed position of electrode $O^2$ as shown in Fig. 1.

Mold cavity passages W are preferably so arranged that a uniform volume of material may be fed without back pressure. This is done by increasing the cross-section of such passage where the dimension becomes smaller. See Fig. 1 taken in connection with Fig. 2. This is readily apparent in the widening section of the passage W in this instance close to the feed lines of the mold cavity. While the passages W narrow down at the point of the contact with the mold cavity the design of the gate at this point is so arranged that a clean break or a break at an optional point may be obtained. It is preferable to have such constriction at the mold cavity itself so as to minimize backpressure and maintain a steady flow of material.

In Fig. 4, the ram 47 is shown retracted permitting additional material to enter the pressure channel L from hopper 53. After that, under ordinary conditions, the plastic material is in a relatively unheated condition in the channel L. Such material may remain in the channel L for an unlimited length of time, and therefore the adjustment of material fed into cavity L need be only sufficient to take care of the molding capacity and a surplus of material will do no harm since there will be no danger of the product prematurely setting up within material cavity L. The material is preferably unheated in channel L except for any relatively low temperature heating which may be carried out through the cord extension plug $O^6$ about to be described.

In Fig. 6 I show a heated extension plug $O^6$ which may be added to the positive electrode $O^2$ in substitution for the flush plug $O^5$ therein (see Fig. 1). The extension plug $O^6$ is preferably but not necessarily cored as at 52 and may be of any length although the diameter should be such that the cross-sectional thickness from the surface of $O^6$ complementary to the bore of the cylinder L, will always provide a safe cross-sectional dimension in view of the heat to be applied, the reactivity of the material and the speed of molding operations. The use of the plug extension $O^6$ eliminates the constriction supporting the internal heating element, and the fact that the cylinder K has a common ground with the electrical apparatus makes the connection to the electrode $O^2$ a most efficient means of providing additional heat where this is necessary, the heating being carried on as though the plug $O^6$ were a continuation of (or another) electrode $O^2$, maintaining a high frequency electrostatic field between the walls of the cylinder defining material cavity L. When this extension plug is used, the stroke of the ram 47 must be such that there is always sufficient material to provide the filling of mold cavity U preferably maintaining thereon pressure during the cure and a safe distance between the ram or its nearest contact surface with the plug extension $O^6$.

In Fig. 7 I show a modification of the truncated cone arrangement of normally closed heating chamber and while this construction may be made adjustable through the use of various size rings or molds, it is of most particular interest for molding certain small, relatively uniform parts, where the heating area need not be as large or where the extension as shown in Fig. 6 may be utilized to assist in such heating arrangement. This arrangement is also of particular interest where high frequency electrostatic heating is substituted for by means of other vapor or fluid heating. Here the heating units or electrodes $O'$ and $O^2$ provide parallel flat faces instead of truncated cone complementary faces.

In both the truncated cone arrangement shown in Figs. 1 to 5 and the modification of the truncated cone arrangement shown in Fig. 7, the heating chamber diverges laterally or radiates outwardly from the feed and pressure channel and thereby increases in lateral dimensions in the direction of flow of the plastic material. The plastic material which flows longitudinally through the feed and pressure channel L thus radiates out laterally as its flows through the heating chamber P. The heating chamber provides an increasingly large area and volume in the direction of the flow of the plastic composition. In both arrangements the large diametered and low pressure passages W, W leading to the mold cavities lead out from a laterally displaced region and more particularly from the wide periphery of the heating chamber.

In Fig. 8 I show a schematic view of the controlled fluid heating system, particularly laid out where such heating is utilized in connection with high frequency electrostatic heating. By this means it is possible to maintain a safe maximum temperature within the electrodes, thus bringing up the efficiency of electrostatic heating and preventing the conductive heat transfer from the material to the surface of the electrodes. The arrangement also is well suited for cooling of material, that is the matter of heating or cooling being purely relative and the apparatus is flexible so that a large variety of materials reacting under various conditions may be molded therein. In Fig. 8 of the drawings, the positive and negative electrodes are indicated as before as $O^2$ and $O'$, the piping from $O^2$ being conventionally here shown as of the sleeve type, with inlet and outlets at 4 and 3, each of which is provided with insulation in series with the piping, indicated at 9. The electrode $O'$ has piping which is indicated as 6 for the inlet and 5 for the outlet. The piping connections from $O'$ and $O^2$ are directly made at the intake or pressure side to the feed pipe 17 by way of the circulating pump 10; and at the outlet side to the return pipe leading to the cooling (or heating coil) 13 located in the heat exchanger housing 14 containing the heating or cooling liquid 12 circulating through the entrance and return pipes 15 and 16. Cooling (or heating) coil 13 feeds pipe 18 to the container or housing of storage tank 11 which is maintained at a predetermined temperature by means of heating coils 19, either heated electrically or by other fluid means through the heating arrangement indicated as at 20 and 21, and thermostatically controlled by thermostat 22 operating switch or valve in series with line 20. 23 shows a conventional thermometer which may be of a recording type. Where electrostatic high frequency heating is utilized the fluid medium is of the non-electrical conductor type, such as for example transformer oil or carbon tetrachloride, or other suitable medium. By utilizing a common storage tank and feeding both the electrodes $O'$ and $O^2$ by means of a common source of non-conducting liquid under conditions where there would be no electrical short circuits, a uniform balance of heating is readily attainable. A vent valve preferably leading outside of the building is indicated at 24. It is, of course, to be understood that separate means of heating, insulated from each other, one unit being ungrounded, may readily be substituted therefor.

To establish the importance of controlled fluid heating as carried on for these cored electrodes $O'$ and $O^2$ it is well to mention that under continuous operation with material heated to say 400° F. and such heating taking place in thicknesses of say ⅛ inch in about 5 or 6 seconds, and an actual molding time somewhat longer than this, in time these electrodes will become heated up to possibly the maximum temperature of the material by mere conductive absorption of heat from the material, or a temperature close to 400° F. With the electrodes maintained at this high temperature and with the molding operation delayed at times, as for the placement of inserts, etc. in the mold, it can readily be apparent that the material in the heating chamber, as formed by these electrodes, would be heated to the point of infusibility, or perhaps even to the point of decomposition if some provision were not made to maintain the temperature of the electrodes at a workable maximum.

On the other hand, if the electrodes were merely cooled and kept cold there would be a loss in efficiency due to the absorption of heat conductively from the material. In the case of certain types of molding material it is found that a number of products may be heated to a temperature as high as 200° to 250° F. and some products may even be heated higher than this without the product being immobilized or cured under the speed of molding operation. For this reason advantage is taken to maintain the electrodes at a certain controlled heat level, whereby the maximum efficiency of heterocyclic heating may be efficiently utilized to rapidly supply the temperature for the interval only to provide such elevated temperature. The material is to be heated rapidly to the maximum exothermic reaction temperature but short of the decomposition temperature and the delivery of such heated material to the mold cavities, new material for the next cycle entering the heating chamber at a lower temperature, without danger of the electrodes conducting heat to the material and causing overheating to be dangerous or exothermic reaction to ensue. Thus through the controlled heating of the electrodes by conductive means it is possible to heat the material to the very maximum temperature short of the decomposition point for delivery to the mold cavity and without danger of overheating. In potentially reactive compositions the cure curve is a time-temperature product and thus a high temperature of short duration is possible for maximum cure efficiency.

In the case of one of our standard furfural resins, the molding compounds made therefrom have been studied in connection with the present method of molding and it has been demonstrated that with suitable compositions moldings of high strength and accuracy may be more readily obtained at the highest operating temperatures allowable. In a product molded in the usual flash or positive molds at a temperature of 330° F. a cure was obtained, without blistering, in approximately 3 minutes, and when still molded under this positive pressure method, but with the product heated to 400° F. using usual conductive heating methods, a molding time of 30 seconds was attained. The bulk of the time required to bring up the temperature to 400° F. by the usual conductive heat methods required approximately 25 seconds, allowing only 5 seconds for cure.

My method does not necessarily call for the use of electrostatic high frequency heating, the heating chamber being utilized for direct conductive heating under relatively high efficiency for the reason that the material is under pressure, is homogeneous and is in close contact with the relatively large area of heating surface instead of being subjected to heat as through a nozzle while moving at high velocity. The controlled conductive heating, however, adds materially to the efficiency of electrostatic heating.

Giving no consideration to the effect of conductive heating, which would raise the temperature of the molding material to a safe and desired non-critical but high temperature of say 250° F. in one example, and not considering that the electrostatic heating should, to attain utmost efficiency and speed of molding, be merely called upon to quickly elevate the safe temperature to a temperature just below the decomposition point of the material, as again for example a top temperature of 470° F., but this could even be as high momentarily as 650° F., the following efficiencies of the electrostatic high frequency heating system will be of interest.

Assuming that only 80% of the heating time can actually be utilized, a very conservative factor of safety being thus allowed for, a molding compound having a specific heat of .45, a power factor of .03, and a density of 1.35, compressed under pressure uniformly between electrodes spaced 1/8 inch apart, the electrodes each having 13 sq. in. of surface, the material in 5 seconds time will be elevated from 70° to 470° F., requiring 11,150 B. t. u. per hour. A kilowatt hour provides 17,000 B. t. u. The heating is thus rapid and economical, but much greater thicknesses and through the use of controlled conductive heating greater speeds and economies are evident.

This rate of heating of a thickness of 1/8 inch of material calls for a voltage per inch across the electrodes of approximately 15,000, with 30,000 representing a peak. The insulation resistance of some of these molding compounds, particularly the phenolics, is materially lowered with increased temperatures and while this voltage figure appears to be safe, still considerable arc-through could be experienced should any particles cling to the electrodes, which may locally raise the voltage gradient to a value greater than the voltage breakdown of air.

Thus it becomes evident that adjustable spacing of the electrodes is of extreme importance, but this alone is insufficient for maximum operating speed conditions, unless the material itself is under pressure and is quite homogeneous, to prevent such arc-through, which would occur if the product were not extremely uniformly compressed or spaced and local super-heating took place. The operation of this method of heating therefore calls for adjustability in the spacing of the electrodes, a uniform compression of the material between the electrodes, the accurate timing of the cycling of the electrostatic heating to maintain temperatures within safe maximums and minimums, and the heating of a substantial thickness and quantity of material between the electrodes, with such material remaining in the heating chamber for a sufficient length of time to attain maximum temperatures and therefore a velocity of material within the heating chamber substantially lower than what would be possible if a nozzle were used. A nozzle arrangement of heating by electrostatic high frequency current is not efficient because it lacks in area exposed to the electrodes, and efficient field density determined by electrode area and field strength cannot readily be maintained to provide efficient heating values. Arc-over and arc-through would occur. While such heating is relatively rapid, there is a time limit and a predetermined volume of material must be heated for a predetermined length of time under conditions of substantial electrode area and field strength to provide the field density needed to obtain the heating values called for. A high velocity nozzle effect is not conducive to uniformity of heating, even in the case of straight conductive heating, depending on heat transfer from heated surfaces.

The adjustability of the heating chamber makes possible rapid molding of materials, calling either for high or low temperatures. It has, for example, often been stated that phenol-furfural resins provide an ideal flow condition under usual positive pressure molding methods and that deep long drawn out moldings can be more readily carried out with materials of the furfural type, but the impression has prevailed that at the usual molding temperatures, say from 300° to 330° F., that the phenol-furfural type of resins are slower in reaction than those compounded of phenol and formaldehyde. The chemical structure of the furfural resins is different from the chemical structure of the phenol-formaldehyde resins. Their molecular weight is higher and they do require a higher energy input, so that when heated and cured at a temperature of 400° F. the reaction is carried through to completion more quickly than when phenol-formaldehyde resin compositions are cured, even though these latter products be cured at 400° F.

With a nozzleless type of molding, as disclosed herein, it is possible at somewhat higher pressures to utilize materials of relatively low flow, as disclosed in my U. S. Patent No. 1,398,149, dated November 22, 1921, which shows that thermosetting resins may be molded and set to the so-called ultimate form, but which when reground and when merely heated do not flux or flow, but when heated and pressure is applied the products do flux and flow and form a homogeneous molded material. There is a large tonnage of phenol resin scrap which is not now being utilized as it is considered as infusible and set. The patent referred to shows that such product can be molded and the present nozzleless type of molding method is ideally suited for the handling of materials of this type.

The method of molding plastic material embodying the principles of my present invention, preferred apparatus employable therewith, the operation of said apparatus and the numerous advantages flowing therefrom and incident thereto as applied to the molding of many kinds of plastic materials, will in the main be fully apparent from the above detailed description thereof. It will be further apparent that many modifications and changes may be made both in the method and in the apparatus without departing from the spirit of the invention defined in the following claims.

I claim:

1. In an apparatus for the formation of molded products from thermosetting or thermoplastic material comprising a material feed and pressure channel and a heating chamber of large area and volume, said feed and pressure channel opening directly into said heating chamber, and said heating chamber comprising two spaced electrodes of complementary large area forming coacting electrode surfaces of a high frequency electrostatic field and acting to heat the material therein while under the pressure generated in said feed and pressure channel, and means for separating one of the electrodes laterally from the other to vary the interelectrode distance and the heating chamber space.

2. In an apparatus for the formation of molded products from thermosetting or thermoplastic material comprising a heating chamber of large area and volume opening at its center region to a material feed channel and at its peripheral region to a material outflow passage, said heating chamber comprising two spaced complementary relatively movable electrodes diverging laterally in the direction of flow of the plastic material from the material feed channel forming coacting electrode surfaces of a high frequency electrostatic field of large area and acting to heat the material flowing therethrough from the one region to the other, and means for separating one electrode laterally from the other to vary the inter-electrode distance therebetween.

3. In an apparatus for the formation of molded products from thermosetting or thermoplastic material comprising a heating chamber of large area and volume opening at one region to a material feed channel and at another region to a material outflow passage, said heating chamber comprising two spaced complimentary relatively separable electrodes defining the walls of said heating chamber, and forming coacting electrode surfaces of a high frequency electrostatic field and acting to heat the plastic material flowing therethrough from the one region to the other, and means for separating one electrode laterally from the other to vary the inter-electrode distance therebetween and also to open said chamber, one of said electrodes being provided with a backdraft formation for retaining previously plasticized material when the electrodes are separated one from the other.

4. An apparatus for the formation of molded products from thermosetting or thermoplastic material comprising, a material feed channel, a heating chamber of large area and volume defined by spaced complementary electrodes forming coacting electrode surfaces of an electrostatic high frequency field, a mold cavity, the feed channel opening directly into the heating chamber, a jetless large diametered passage connecting the heating chamber with the mold cavity, said electrostatic heating chamber diverging laterally from said feed channel and thereby increasing in lateral dimensions in the direction of flow of the plastic material and said jetless passage leading out from a laterally displaced region of said heating chamber, pressure means for feeding the material through the feed channel, the material thence freely feeding through the heating chamber, the said passage, and into the mold cavity, the said electrostatic heating chamber acting to heat the material in transit to a moldable condition and to permit the same to freely flow therethrough while under the pressure generated in the feed channel, the said jetless large diametered passage acting to permit the thus heated plastic material to flow in a uniform volume from the heating chamber to the mold cavity, whereby the material is fed, heated to a moldable condition, and molded under conditions of low pressure throughout untilizing a low friction and nozzleless apparatus.

5. An apparatus for the formation of molded products from thermosetting or thermoplastic material comprising, a material feed channel, a heating chamber of large area and volume defined by a two spaced complementary electrode units forming coacting electrode surfaces of an electrostatic high frequency high field, the said units being separable laterally one from the other to vary the distance between the electrode surfaces, a mold cavity, the feed channel opening directly into the heating chamber, a jetless large diametered passage connecting the heating chamber with the mold cavity, pressure means for feeding the material through the feed channel, the material thence freely feeding through the heating chamber, the said passage, and into the mold cavity, the said electrostatic heating chamber acting to heat the material in transit to a moldable condition and to permit the same to freely flow therethrough while under the pressure generated in the feed channel, the said jetless large diametered passage acting to permit the thus heated plastic material to flow in a uniform volume from the heating chamber to the mold cavity, whereby the material is fed, heated to a moldable condition, and molded under conditions of low pressure throughout utilizing a low friction and nozzleless apparatus.

6. An apparatus for the formation of molded products from thermosetting or thermoplastic material comprising, a material feed channel, a heating chamber of large area and volume defined by spaced complementary electrodes forming coacting electrode surfaces of an electrostatic high frequency field, a mold cavity, the feed channel opening directly into the heating chamber, a jetless large diametered passage connecting the heating chamber with the mold cavity, said electrodes comprising two spaced relatively movable complementary units forming coacting heating surfaces when relatively fixed, the said mold cavity being defined by relatively movable mold sections, means for separating the units of said heating chamber to vary the distance between the electrodes or to open the chamber, means for relatively moving the sections of said mold, pressure means for feeding the material through the feed channel, the material thence freely feeding through the heating chamber, the said passage, and into the mold cavity, the said electrostatic heating chamber acting to heat the material in transit to a moldable condition and to permit the same to freely flow therethrough while under the pressure generated in the feed channel, the said jetless large diametered passage acting to permit the thus heated plastic material to flow in a uniform volume from the heating chamber to the mold cavity, whereby the material is fed, heated to a moldable condition, and molded under conditions of low pressure throughout utilizing a low friction and nozzleless apparatus.

7. An apparatus for the formation of molded products from thermosetting or thermoplastic material comprising, a material feed channel, a heating chamber of large area and volume defined by spaced complementary electrodes forming coacting electrode surfaces of an electrostatic high frequency field, a mold cavity, the feed channel opening directly into the heating chamber, a jetless large diametered passage connecting the heating chamber with the mold cavity, the said heating chamber comprising two spaced relatively movable complementary units, the said mold cavity being defined by relatively movable mold sections, means for relatively moving the said units of said heating chamber to open the same, means for relatively moving the sections of said mold, the means for relatively moving said units and the means for relatively moving the mold sections being connected by means to permit the opening of the mold without opening the heating chamber and to permit the simultaneous opening of both the mold and the heating chamber, pressure means for feeding the material through the feed channel, the material thence freely feeding through the heating chamber, the said passage, and into the mold cavity, the said electrostatic heating chamber acting to heat the material in transit to a moldable condition and to permit the same to freely flow therethrough while under the pressure generated in the feed channel, the said jetless large diametered passage acting to permit the thus heated plastic material to flow in a uniform volume from the heating chamber to the mold cavity, whereby the material is fed, heated to a moldable condition, and molded under conditions of low pressure throughout utilizing a low friction and nozzleless apparatus.

EMIL E. NOVOTNY.

REFERENCES CITED

The following references are of record in the file of this patent:

UNITED STATES PATENTS

| Number | Name | Date |
|---|---|---|
| 1,806,846 | Fox et al. | May 26, 1931 |
| 1,972,050 | Davis | Aug. 28, 1934 |
| 2,057,945 | Gastrow | Oct. 20, 1936 |
| 2,131,319 | Greenholtz et al. | Sept. 27, 1938 |
| 2,179,261 | Keller | Nov. 7, 1939 |
| 2,233,558 | Shaw | Mar. 4, 1941 |
| 2,243,968 | Lester | June 3, 1941 |
| 2,254,119 | Lester | Aug. 26, 1941 |
| 2,269,388 | Weida | Jan. 6, 1942 |
| 2,296,948 | Pitman | Sept. 29, 1942 |
| 2,309,496 | Bird et al. | Jan. 26, 1943 |
| 2,319,482 | Tucker | May 18, 1943 |
| 2,358,624 | Burry | Sept. 19, 1944 |

FOREIGN PATENTS

| Number | Country | Date |
|---|---|---|
| 517,798 | Great Britain | Feb. 8, 1940 |